(12) United States Patent
Choi et al.

(10) Patent No.: US 11,322,734 B2
(45) Date of Patent: May 3, 2022

(54) NEGATIVE ELECTRODE ACTIVE MATERIAL, NEGATIVE ELECTRODE COMPRISING THE NEGATIVE ELECTRODE ACTIVE MATERIAL, AND SECONDARY BATTERY COMPRISING THE NEGATIVE ELECTRODE

(71) Applicant: LG CHEM, LTD., Seoul (KR)

(72) Inventors: Jung Hyun Choi, Daejeon (KR); Yong Ju Lee, Daejeon (KR); Dong Hyuk Kim, Daejeon (KR); Eun Kyung Kim, Daejeon (KR); Rae Hwan Jo, Daejeon (KR); Il Geun Oh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 270 days.

(21) Appl. No.: 16/611,394

(22) PCT Filed: May 10, 2018

(86) PCT No.: PCT/KR2018/005407
§ 371 (c)(1),
(2) Date: Nov. 6, 2019

(87) PCT Pub. No.: WO2018/208111
PCT Pub. Date: Nov. 15, 2018

(65) Prior Publication Data
US 2020/0168890 A1    May 28, 2020

(30) Foreign Application Priority Data

May 12, 2017   (KR) ..................... 10-2017-0059577

(51) Int. Cl.
| | |
|---|---|
| *H01M 4/133* | (2010.01) |
| *H01M 4/525* | (2010.01) |
| *H01B 1/04* | (2006.01) |
| *H01M 4/131* | (2010.01) |
| *H01M 4/134* | (2010.01) |
| *H01M 4/136* | (2010.01) |
| *H01M 4/36* | (2006.01) |
| *H01M 4/38* | (2006.01) |
| *H01M 4/58* | (2010.01) |
| *H01M 4/583* | (2010.01) |
| *H01M 10/0525* | (2010.01) |
| *H01M 4/02* | (2006.01) |

(52) U.S. Cl.
CPC ............. *H01M 4/133* (2013.01); *H01B 1/04* (2013.01); *H01M 4/131* (2013.01); *H01M 4/134* (2013.01); *H01M 4/136* (2013.01); *H01M 4/364* (2013.01); *H01M 4/386* (2013.01); *H01M 4/525* (2013.01); *H01M 4/583* (2013.01); *H01M 4/5825* (2013.01); *H01M 10/0525* (2013.01); *H01M 2004/021* (2013.01); *H01M 2004/027* (2013.01); *H01M 2004/028* (2013.01)

(58) Field of Classification Search
CPC ........... H01B 1/04; H01B 1/08; H01M 4/131; H01M 4/133; H01M 4/134; H01M 4/136; H01M 4/386; H01M 4/525; H01M 4/583
See application file for complete search history.

(56) References Cited

U.S. PATENT DOCUMENTS

| | | | |
|---|---|---|---|
| 10,950,853 B2 * | 3/2021 | Choi | .................... H01M 4/485 |
| 2006/0147797 A1 | 7/2006 | Wu et al. | |
| 2014/0342228 A1 | 11/2014 | Liu et al. | |
| 2015/0221950 A1 | 8/2015 | Minami et al. | |
| 2016/0336586 A1 | 11/2016 | Tuduki et al. | |
| 2017/0005329 A1 | 1/2017 | Kim et al. | |
| 2017/0081248 A1 * | 3/2017 | Jeong | ................ C04B 35/62886 |
| 2018/0083263 A1 | 3/2018 | Cho et al. | |
| 2018/0175378 A1 * | 6/2018 | Cheng | ................... H01M 4/366 |

FOREIGN PATENT DOCUMENTS

| | | |
|---|---|---|
| CN | 101533907 A | 9/2009 |
| CN | 103797621 A | 5/2014 |
| CN | 104157866 A | 11/2014 |
| CN | 105047870 A | 11/2015 |
| CN | 106328889 A | 1/2017 |
| JP | 2007-59213 A | 3/2007 |
| JP | 2013-197069 A | 9/2013 |
| JP | 2015-125817 A | 7/2015 |
| KR | 10-2014-0107926 A | 9/2014 |
| KR | 10-2016-0115270 A | 10/2016 |

(Continued)

OTHER PUBLICATIONS

English language machine translation of form PCT/ISA/237 (mailed May 2017).*

(Continued)

*Primary Examiner* — Mark Kopec

(74) *Attorney, Agent, or Firm* — Birch, Stewart, Kolasch & Birch, LLP

(57) ABSTRACT

A negative electrode active material which includes a secondary particle including first primary particles, wherein the first primary particle includes a core including $SiO_x$, wherein $0 \le x < 2$, an intermediate layer which covers at least a portion of a surface of the core and includes silicon nitride, silicon oxynitride, or a mixture thereof, and a carbon coating layer which covers at least a portion of the intermediate layer and includes nitrogen-doped carbon, and a negative electrode and a lithium secondary battery which include the same.

14 Claims, No Drawings

(56) References Cited

FOREIGN PATENT DOCUMENTS

KR   10-2016-0128279 A   11/2016
KR   10-2016-0149862 A   12/2016
KR   10-2017-0004673 A   1/2017

OTHER PUBLICATIONS

Extended European Search Report for European Application No. 18799252.4, dated Feb. 24, 2020.
International Search Report (PCT/ISA/210) issued in PCTAKR2018/005407, dated Aug. 23, 2016.

* cited by examiner

NEGATIVE ELECTRODE ACTIVE MATERIAL, NEGATIVE ELECTRODE COMPRISING THE NEGATIVE ELECTRODE ACTIVE MATERIAL, AND SECONDARY BATTERY COMPRISING THE NEGATIVE ELECTRODE

CROSS-REFERENCE TO RELATED APPLICATIONS

This application claims the benefit of Korean Patent Application No. 10-2017-0059577, filed on May 12, 2017, in the Korean Intellectual Property Office, the disclosure of which is incorporated herein in its entirety by reference.

TECHNICAL FIELD

The present invention relates to a negative electrode active material, as a secondary particle comprising primary particles which comprise a core comprising $SiO_x$ (0≤x<2), an intermediate layer covering at least a portion of a surface of the core, and a carbon coating layer covering at least a portion of the intermediate layer, a negative electrode comprising the negative electrode active material, and a secondary battery comprising the negative electrode.

BACKGROUND ART

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. Among these secondary batteries, lithium secondary batteries having high energy density, i.e., high capacity, have been subjected to considerable research and have been commercialized and widely used.

In general, a secondary battery is composed of a positive electrode, a negative electrode, an electrolyte, and a separator. The negative electrode comprises a negative electrode active material in which lithium ions from the positive electrode are intercalated and deintercalated, and silicon-based particles having high discharge capacity may be used as the negative electrode active material. However, the silicon-based particle, such as $SiO_x$ (0≤x<2), has low initial efficiency and its volume is excessively changed during charge and discharge. Thus, there is a limitation in that lifetime of the battery is reduced.

In order to address this limitation, a $SiO_2$ layer or a carbon coating layer was typically formed on a surface of the silicon-based particle. However, even if the above method is used, since volume control is not smooth as charge and discharge cycles of the battery proceed, efficiency may be reduced. Korean Patent Application Laid-open Publication No. 10-2016-0149862 discloses that a volume change is further controlled by additionally disposing a polymer composite on the carbon coating layer.

However, even if the polymer composite is used, the control of the volume change may not be easy, resistance may be increased due to a decrease in conductivity of the active material, and capacity retention of the battery may be reduced. Also, since the silicon-based particle is excessively coated, absorption of lithium ions is not easy, and thus, capacity may be reduced.

Therefore, there is a need to develop a negative electrode active material which may effectively control the volume change during charge and discharge of the secondary battery, may reduce the resistance of the negative electrode, and may increase the capacity retention of the battery.

DISCLOSURE OF THE INVENTION

Technical Problem

An aspect of the present invention provides a negative electrode active material which may effectively control a volume change during charge and discharge of a secondary battery, may reduce resistance of a negative electrode, and may increase capacity retention of the battery.

Another aspect of the present invention provides a negative electrode comprising the negative electrode active material.

Another aspect of the present invention provides a secondary battery comprising the negative electrode.

Technical Solution

According to an aspect of the present invention,
there is provided a negative electrode active material which is a secondary particle comprising primary particles, wherein the primary particle comprises a core comprising $SiO_x$ (0≤x<2); an intermediate layer which covers at least a portion of a surface of the core and comprises silicon nitride, silicon oxynitride, or a mixture thereof; and a carbon coating layer which covers at least a portion of the intermediate layer and comprises nitrogen-doped carbon.

According to another aspect of the present invention, there is provided a negative electrode comprising the negative electrode active material.

According to another aspect of the present invention, there is provided a secondary battery comprising the negative electrode.

Advantageous Effects

Since a negative electrode active material according to the present invention comprises an intermediate layer comprising silicon nitride, silicon oxynitride, or a mixture thereof and a carbon coating layer comprising nitrogen-doped carbon, conductivity of the negative electrode active material may be improved and a volume change of a core in the negative electrode active material may be effectively controlled, and thus, capacity retention of a battery may be improved. Also, in a case in which excessive heat is generated due to a short circuit in the battery, since an increase in temperature due to the heat may be delayed, a series of exothermic reactions may be prevented.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may comprise plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A negative electrode active material of the present invention comprises a secondary particle comprising first primary particles, wherein the first primary particles comprise a core comprising $SiO_x$, wherein $0 \leq x < 2$ an intermediate layer which covers at least a portion of a surface of the core and comprises silicon nitride, silicon oxynitride, or a mixture thereof; and a carbon coating layer which covers at least a portion of the intermediate layer and comprises nitrogen-doped carbon.

<Primary Particle>

The core comprises $SiO_x$ ($0 \leq x < 2$). The $SiO_x$ ($0 \leq x < 2$) may be in the form in which silicon (Si) and $SiO_2$ are included. That is, x corresponds to a ratio of the number of oxygen (O) atoms to Si atoms included in the $SiO_x$ ($0 \leq x < 2$). In a case in which the core comprises the $SiO_x$ ($0 \leq x < 2$), discharge capacity of a secondary battery may be improved.

An average particle diameter ($D_{50}$) of the core may be in a range of 0.1 μm to 100 μm, for example 0.1 μm to 20 μm or 0.5 μm to 5 μm. In a case in which the core satisfies the above-described average particle diameter range, since a side reaction with an electrolyte solution may be suppressed and oxidation of the core may be controlled, a reduction in initial efficiency may be prevented. Also, when the primary particles aggregate to form a secondary particle, since a contact between the primary particles is uniform, strength of the secondary particle may be increased and the secondary particle may appropriately have a particle shape.

In the present specification, the average particle diameter ($D_{50}$) may be defined as a particle diameter at 50% in the cumulative particle diameter distribution. The average particle diameter, for example, may be measured by using a laser diffraction method. The laser diffraction method may generally measure a particle diameter ranging from a submicron level to a few mm and may obtain highly repeatable and high-resolution results.

The intermediate layer may cover at least a portion of the surface of the core and may cover the entire surface of the core. Excessive volume expansion of the core during charge and discharge of the battery may be effectively controlled by the intermediate layer.

The intermediate layer comprises silicon nitride, silicon oxynitride, or a mixture thereof, and, specifically, the intermediate layer may be formed of at least one of silicon nitride and silicon oxynitride. The silicon nitride may comprise $Si_3N_4$. The silicon oxynitride may be a compound represented by $SiO_mN_n$ ($0 < m \leq 2$, $0 < n \leq 4$), and may be specifically $SiO_2N_2$ and/or $SiN_3O$. Since the intermediate layer comprises the silicon nitride, the silicon oxynitride, or the mixture thereof, intercalation of lithium ions may be smoothly performed by nitrogen of the silicon nitride or the silicon oxynitride. Accordingly, the initial efficiency of the secondary battery may be improved. Furthermore, since at least one of the silicon nitride and the silicon oxynitride, which are stable in high temperatures, is present on the surface of the core, an additional exothermic reaction occurring in the core may be suppressed even when an exothermic reaction due to an internal short circuit of the battery occurs. Also, since at least one of the silicon nitride and the silicon oxynitride, which have high hardness, is present on the surface of the core, the excessive volume expansion of the core during charge and discharge of the battery may be effectively controlled. Thus, capacity retention of the battery may be improved.

A thickness of the intermediate layer may be in a range of 1 nm to 100 nm, for example, 1 nm to 50 nm. In a case in which the above thickness range is satisfied, a change in the volume of the core may be effectively controlled, and the additional exothermic reaction of the core may be effectively prevented. Also, since a ratio of the core may be properly maintained, an excessive decrease in the discharge capacity may be prevented.

The intermediate layer may be formed by heat treating the core in a $N_2$ and/or $NH_3$ atmosphere or by a chemical vapor deposition (CVD) method using silane gas and $NH_3$ gas as a source, but the present invention is not limited thereto.

The carbon coating layer may cover at least a portion of the intermediate layer and may cover the entire intermediate layer. The excessive volume expansion of the core during charge and discharge of the battery may be more effectively controlled by the carbon coating layer, and resistance of a negative electrode may be reduced by increasing conductivity of the active material.

The carbon coating layer comprises nitrogen-doped carbon. Since the carbon included in the carbon coating layer is doped with nitrogen, the conductivity of the negative electrode active material may be further increased due to the nitrogen, and the intercalation of lithium ions may be smoothly performed. In a case in which the carbon coating layer as well as the intermediate layer is included in the negative electrode active material, since hardness of a surface of the negative electrode active material may be further increased, the volume change during charge and discharge may be more effectively controlled.

In the carbon coating layer, the nitrogen may be included in an amount of 0.05 wt % to 20 wt %, for example, 0.1 wt % to 18 wt % based on a total weight of the carbon coating layer. In a case in which the above range is satisfied, conductivity of the carbon coating layer is increased, and thus, the resistance of the electrode may be more effectively reduced.

A thickness of the carbon coating layer may be in a range of 1 nm to 100 nm, for example, 5 nm to 50 nm. In a case in which the above range is satisfied, electrical conductivity of the battery may be improved while maintaining a conductive path in the negative electrode active material.

A weight ratio of the intermediate layer to the carbon coating layer may be in a range of 1:99 to 20:80, for example, 5:95 to 15:85. In a case in which the above weight ratio is satisfied, the change in the volume of the core may be more effectively controlled, and the conductivity of the negative electrode active material may be further improved.

<Secondary Battery>

The negative electrode active material of the present invention, as a secondary particle comprising the primary particles, is a secondary particle which is formed by aggregation, bonding, or assembly of the primary particles.

The expression "primary particle" in the specification of the present invention denotes an original particle when a different kind of particle is formed from one particle, and a secondary particle may be formed by aggregation, bonding, or assembly of a plurality of primary particles.

The expression "secondary particle" in the specification of the present invention denotes a physically distinguishable large particle which is formed by aggregation, bonding, or assembly of each primary particle.

In the specification of the present invention, the expression "assembly" of the primary particles denotes a process of forming a secondary particle in which the plurality of primary particles is spontaneously or artificially agglomerated or aggregated to form an aggregate composed of the primary particles, wherein it may be interchangeably used with the same meaning as the expression, such as "aggregation" or "bonding".

Two or more primary particles may gather to form a secondary particle. Since the primary particle has a small particle diameter, a diffusion distance of lithium (Li) ions is reduced, and thus, incoming and outgoing of the Li ions may be facilitated to exhibit excellent output characteristics. With respect to the primary particle, it is disadvantageous in that, since a specific surface area is large due to the small particle diameter, the side reaction with the electrolyte solution increases, but, since the specific surface area is reduced when the primary particles gather to form a secondary particle form, the side reaction may be reduced. Since the negative electrode active material of the present invention is in the form of a secondary particle comprising the primary particles, both of the advantages of the primary particle and the advantages of the secondary particle may be exhibited, and thus, the negative electrode active material of the present invention may have an effect of reducing the side reaction with the electrolyte solution while exhibiting excellent output characteristics.

The secondary particle may be prepared by a method in which the primary particles, for example, are dispersed in a solvent comprising alcohol, specifically, a dispersion solvent in which alcohol and water are mixed, a preliminary secondary particle is prepared by spray drying the dispersion, and the preliminary secondary particle is then heat-treated.

Alternatively, the secondary particle may also be prepared by a method in which the primary particles are mixed with an adhesive binder to form secondary particles, the secondary particles are heat-treated, and the heat-treated secondary particles are disintegrated.

The adhesive binder may be disposed between the primary particles to provide adhesion between the primary particles, and thus, the adhesive binder may allow the primary particles to be aggregated, bonded, or assembled to form the secondary particle. Thus, the secondary particle may comprise the adhesive binder between the primary particles. The adhesive binder, for example, may comprise at least one selected from the group consisting of a petroleum-derived pitch, a coal-derived pitch, and a mesophase pitch.

The heat treatment, for example, may be performed in a temperature range of 300° C. to 1,300° C., specifically, 500° C. to 1,100° C. In a case in which the heat treatment is performed within the above temperature range, a size of Si crystals included in the core may not be excessively increased while being able to form the secondary particle appropriately.

An average particle diameter ($D_{50}$) of the secondary particle may be in a range of 2 μm to 100 μm, for example, 2 μm to 50 μm. In a case in which the secondary particle satisfies the above-described average particle diameter range, since the side reaction with the electrolyte solution may be suppressed and appropriate electrode density may be obtained, the electrode may have appropriate capacity per volume and there is an advantageous effect on an electrode preparation process.

<Metal Compound-Doped Primary Particle>

The primary particle included in the secondary particle may be a metal compound-doped primary particle in which at least one of the core, the intermediate layer, and the carbon coating layer comprises a metal compound.

The metal compound-doped primary particle comprises a core comprising $SiO_x$ (0≤x<2); an intermediate layer which covers at least a portion of a surface of the core and comprises silicon nitride, silicon oxynitride, or a mixture thereof; and a carbon coating layer which covers at least a portion of the intermediate layer and comprises nitrogen-doped carbon, wherein at least one of the core, the intermediate layer, and the carbon coating layer may comprise a metal compound.

That is, the metal compound-doped primary particle further comprises a metal compound in the primary particle, wherein it denotes a particle in which the metal compound is doped into the primary particle which comprises the core comprising $SiO_x$ (0≤x<2); the intermediate layer which covers at least a portion of the surface of the core and comprises silicon nitride, silicon oxynitride, or a mixture thereof; and the carbon coating layer which covers at least a portion of the intermediate layer and comprises nitrogen-doped carbon.

Also, the secondary particle may further comprise the metal compound-doped primary particle, in which at least one of the core, the intermediate layer, and the carbon coating layer comprises a metal compound, in addition to the primary particle which comprises the core comprising $SiO_x$ (0≤x<2); the intermediate layer which covers at least a portion of the surface of the core and comprises silicon nitride, silicon oxynitride, or a mixture thereof; and the carbon coating layer which covers at least a portion of the intermediate layer and comprises nitrogen-doped carbon. That is, the secondary particle may comprise both of the primary particle comprising the core, the intermediate layer, and the carbon coating layer, and the metal compound-doped primary particle in which at least one of the core, the intermediate layer, and the carbon coating layer comprises a metal compound.

In a case in which the secondary particle further comprises the metal compound-doped primary particle in addition to the primary particle, a weight ratio of the primary particle to the metal compound-doped primary particle may be in a range of 10:90 to 90:10, for example, 20:80 to 80:20. In a case in which the secondary particle comprises the primary particle and the metal compound-doped primary particle at the above weight ratio, advantages of each of the primary particle and the metal compound-doped primary particle may be appropriately harmonized to improve the initial efficiency while increasing the capacity retention and reduce an electrode thickness change rate.

Also, in the case that the secondary particle comprises the primary particle and the metal compound-doped primary particle at the above weight ratio, a passage through which the electrolyte solution may be introduced into the secondary particle upon contact with the electrolyte solution is formed according to a difference in swelling ratios between the two types of primary particles with respect to the electrolyte solution, and, accordingly, improved discharge rate characteristics may be exhibited.

In an embodiment of the present invention, the metal compound may be included in the core of the primary particle. The metal compound may be formed by oxidation of a metal which may reduce the $SiO_x$ ($0 \leq x < 2$), specifically, a metal having a reducing power capable of reducing silicon dioxide ($SiO_2$) in the $SiO_x$ ($0 \leq x < 2$) to silicon. The metal compound may comprise at least one of metal oxide and metal silicate.

The metal oxide may comprise an oxide of at least one selected from the group consisting of lithium (Li), magnesium (Mg), aluminum (Al), calcium (Ca), and titanium (Ti). Specifically, the metal oxide may be at least one of MgO, $Li_2O$, and $Al_2O_3$.

The metal silicate may comprise a silicate of at least one selected from the group consisting of Li, Mg, Al, Ca, and Ti. Specifically, the metal silicate may be at least one of $MgSiO_3$, $Mg_2SiO_4$, $Li_2SiO_3$, $Li_4SiO_4$, $Li_2Si_2O_5$, $Al_6SiO_{13}$, and $Al_4SiO_8$.

The metal compound may be formed by a metal doped into the core. Since the metal is doped into the core, a SiO and/or $SiO_2$ matrix may be reduced and the metal compound may be formed. Accordingly, since an amount of $SiO_2$, which acts as an initial irreversible phase, may be reduced, the initial efficiency of the battery may be improved.

The metal compound may be included in an amount of 1 wt % to 60 wt %, for example, 2 wt % to 50 wt % based on a total weight of the core. When the above range is satisfied, the initial efficiency of the battery may be further improved, and an excessive increase in the size of the Si crystals in the core may be prevented.

Also, the present invention provides a negative electrode comprising the negative electrode active material. The negative electrode may comprise a current collector and a negative electrode active material layer disposed on the current collector. The negative electrode active material layer may comprise the negative electrode active material. Furthermore, the negative electrode active material layer may further comprise a binder and/or a conductive agent.

The current collector is not particularly limited as long as it has conductivity without causing adverse chemical changes in the battery. For example, copper, stainless steel, aluminum, nickel, titanium, fired carbon, or aluminum or stainless steel that is surface-treated with one of carbon, nickel, titanium, silver, or the like may be used as the current collector. Specifically, a transition metal that adsorbs carbon well, such as copper or nickel, may be used as the current collector. The current collector may have a thickness of 6 µm to 20 µm, but the thickness of the current collector is not limited thereto.

The binder may comprise at least one selected from the group consisting of a polyvinylidene fluoride-hexafluoropropylene copolymer (PVDF-co-HFP), polyvinylidene fluoride (PVDF), polyacrylonitrile, polymethylmethacrylate, polyvinyl alcohol, carboxymethylcellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, polyacrylic acid, and polymers in which hydrogen thereof is substituted with Li, sodium (Na), or Ca, and may also comprise various copolymers thereof.

The conductive agent is not particularly limited as long as it has conductivity without causing adverse chemical changes in the battery, and, conductive materials, for example, graphite such as natural graphite and artificial graphite; carbon black such as acetylene black, Ketjen black, channel black, furnace black, lamp black, and thermal black; conductive fibers such as carbon fibers or metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Furthermore, the present invention provides a secondary battery comprising the negative electrode. The secondary battery may comprise the negative electrode, a positive electrode, a separator disposed between the negative electrode and the positive electrode, and an electrolyte. Since the negative electrode has been described above, detailed descriptions thereof will be omitted.

The positive electrode may comprise a positive electrode current collector and a positive electrode active material layer which is formed on the positive electrode current collector and comprises a positive electrode active material..

In the positive electrode, the positive electrode current collector is not particularly limited as long as it has conductivity without causing adverse chemical changes in the batteries, and, for example, stainless steel, aluminum, nickel, titanium, fired carbon, or aluminum or stainless steel that is surface-treated with one of carbon, nickel, titanium, or silver may be used. Also, the positive electrode current collector may typically have a thickness of 3 µm to 500 µm and may have a surface with fine roughness to improve adhesion to the positive electrode active material. The positive electrode current collector may be used in various shapes, for example, a film, a sheet, a foil, a net, a porous body, a foam body, a non-woven fabric body, and the like.

The positive electrode active material may be a typically used positive electrode active material. Specifically, die positive electrode active material may comprise a layered compound, such as lithium cobalt oxide ($LiCoO_2$), lithium nickel oxide ($LiNiO_2$), $Li[Ni_xCo_yMn_zM_v]O_2$ (where M is any one selected from the group consisting of aluminum (Al), gallium (Ga), and indium (In), or two or more elements thereof; and $0.3 \leq x < 1.0$, $0 \leq y$, $z \leq 0.5$, $0 \leq v \leq 0.1$, and $x+y+z+v=1$), $Li(Li_aM_{b-a-b'}M'_{b'})O_{2-c}A_c$ (where $0 \leq a \leq 0.2$, $0.6 \leq b \leq 1$, $0 \leq b' \leq 0.2$, and $0 \leq c \leq 0.2$; M comprises manganese (Mn) and at least one selected from the group consisting of nickel (Ni), cobalt (Co), iron (Fe), chromium (Cr), vanadium (V), copper (Cu), zinc (Zn), and Ti; M' is at least one selected from the group consisting of Al, Mg, and boron (B); and A is at least one selected from the group consisting of phosphorous (P), fluorine (F), sulfur (S), and nitrogen (N)), or a compound substituted with at least one transition metal; lithium manganese oxides such as the chemical formula $Li_{1+y}Mn_{2-y}O_4$ (where y ranges from 0 to 0.33), $LiMnO_3$, $LiMnO_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxide represented by the chemical formula $LiNi_{1-y}M_yO_2$ (where M is Co, Mn, Al, Cu, Fe, Mg, B, or Ga, and y ranges from 0.01 to 0.3); lithium manganese complex oxide represented by the chemical formula $LiMn_{2-y}M_yO_2$ (where M is Co, Ni, Fe, Cr, Zn, or tantalum (Ta), and y ranges from 0.01 to 0.1) or $Li_2Mn_3MO_8$ (where M is Fe, Co, Ni, Cu, or Zn); $LiMn_2O_4$ having a part of Li being substituted with alkaline earth metal ions; a disulfide compound; and $Fe_2(MoO_4)_3$, but the positive electrode active material is not limited thereto. The positive electrode may be Li-metal.

The positive electrode active material layer may comprise a positive electrode conductive agent and a positive electrode binder as well as the above-described positive electrode active material.

In this case, the positive electrode conductive agent is used for providing conductivity to the electrode, wherein any conductive agent may be used without particular limitation as long as it has electronic conductivity without causing adverse chemical changes in the battery. Specific examples of the positive electrode conductive agent may be graphite such as natural graphite and artificial graphite; a carbon-based material such as carbon black, acetylene black, Ketjen black, channel black, furnace black, lamp black, thermal black, and carbon fibers; metal powder, such as copper powder, nickel powder, aluminum powder, and silver powder, or metal fibers; conductive whiskers such as zinc oxide whiskers and potassium titanate whiskers; conductive metal oxide such as titanium oxide; or conductive polymers such as polyphenylene derivatives, and one alone or a mixture of two or more thereof may be used.

Also, the positive electrode binder functions to improve binding between positive electrode active material particles and adhesion between the positive electrode active material and the positive electrode current collector. Specific examples of the positive electrode binder may be polyvinylidene fluoride (PVDF), a polyvinylidene fluoride-hexafluoropropylene copolymer (PVDF-co-REP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluoro rubber, or various copolymers thereof, and one alone or a mixture of two or more thereof may be used.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator comprising a ceramic component or a polymer component may be used to secure heat resistance or mechanical strength, and the separator having a single layer or multilayer structure may be selectively used.

The electrolyte may comprise an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may comprise a non-aqueous organic solvent and a metal salt.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxyfuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimetlioxy methane, a dioxolane derivative, sulfolane, methyl sulfolane, 1,3-dimethyl-2-imidazolidinone, a propylene carbonate derivative, a tetrahydrofiiran derivative, ether, methyl propionate, and ethyl propionate.

In particular, ethylene carbonate and propylene carbonate, ring-type carbonates among the carbonate-based organic solvents, well dissociate a lithium salt in the electrolyte solution due to high dielectric constants as high-viscosity organic solvents, and thus, the ring-type carbonate may be preferably used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate may be more preferably used.

A lithium salt may be used as the metal salt, and the lithium salt is a material that is readily soluble in the non aqueous electrolyte solution, wherein, for example, any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

At least one additive, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving life characteristics of the battery, preventing a decrease in battery capacity, and improving discharge capacity of the battery.

According to another embodiment of the present invention, a battery module comprising the secondary battery as a unit cell and a battery pack comprising the battery module are provided. Since the battery module and the battery pack comprise the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

EXAMPLES

Hereinafter, preferred examples will be provided for better understanding of the present invention. It will be apparent to those skilled in the art that these examples are only provided to illustrate the present invention and various modifications and alterations are possible within the scope and technical spirit of the present invention. Such modifications and alterations fall within the scope of claims included herein.

Example 1: Preparation of Electrode (1) Preparation of Negative Electrode Active Material After 10 g of SiO having an average particle diameter ($D_{50}$) of 1 μm was prepared and silane gas ($SiH_4$) and ammonia gas ($NH_3$) were introduced, an intermediate layer (silicon nitride layer) was formed on the SiO by chemical vapor deposition (CVD) at 800° C. During XPS depth profile measurements (etching rate: 1 nm/10 seconds, etching time: 10 seconds), a thickness of the intermediate layer formed was about 1 nm. Also, as a result of measurement using an ONH analyzer, an amount of nitrogen included in the intermediate layer was 0.5 wt %. Thereafter, methane gas ($CH_4$) and ammonia gas were introduced at a ratio of 1:2 and CVD was performed to form a carbon coating layer (thickness: 5 nm) containing nitrogen on the intermediate layer. Primary particles were prepared by the above process. As a result of measurement using an ONH analyzer, an amount of nitrogen included in the primary particle was 3.7 wt %, and an amount of nitrogen included in the carbon coating layer was found to be 3.2 wt % except for 0.5 wt %, the amount of nitrogen included in the intermediate layer.

A solution, in which the primary particles and ethanol/water (volume ratio=1:9) were included in a volume ratio of 1:10, was stirred at 10,000 rpm for 30 minutes with a mechanical homogenizer to prepare a dispersion solution for spray drying. The dispersion solution was spray-dried under conditions comprising an inlet temperature of 180° C., an aspirator rate of 95%, and a feeding rate of 12 using a mini spray-dryer (manufacturer: Buchi, model: B-290 Mini Spray-Dryer) to prepare preliminary secondary particles, and the preliminary secondary particles were then transferred to an alumina boat. After a temperature of a tube furnace equipped with a quartz tube with a length of 80 cm and an inner diameter of 4.8 cm was increased to 600° C. at a rate of 10° C./min, secondary particles were prepared by sintering while maintaining the temperature for 2 hours. An average particle diameter ($D_{50}$) of the secondary particles prepared was 5 μm.

(2) Preparation of Negative Electrode

The negative electrode active material, fine graphite as a conductive agent, and polyacrylonitrile, as a hinder, were mixed in a weight ratio of 7:2:1 to prepare 0.2 g of a mixture. A negative electrode mixture shiny was prepared by adding 3.1 g of N-methyl-2-pyrrolidone (NMP), as a solvent, to the mixture. A 20 μm thick copper (Cu) thin film, as a negative electrode current collector, was coated with the negative electrode mixture slurry and dried. In this case, a temperature of circulating air was 80° C. Subsequently, the coated negative electrode current collector was roll-pressed and dried in a vacuum oven at 130° C. for 12 hours to prepare a negative electrode.

(3) Preparation of Secondary Battery

The prepared negative electrode was cut into a circle of area 1.4875 $cm^2$, and a Li-metal thin film cut into a circle of area 1.7671 $cm^2$ was used as a positive electrode. A porous polyethylene separator was disposed between the positive electrode and the negative electrode, and a lithium coin half-cell was prepared by injecting an electrolyte solution in which 0.5 wt % vinylene carbonate was dissolved and 1 M $LiPF_6$ was dissolved in a mixed solution in which a mixing volume ratio of ethyl methyl carbonate (EMC) to ethylene carbonate (EC) was 7:3.

Example 2: Preparation of Battery (1) Preparation of Negative Electrode Active Material An intermediate layer was formed on the core in the same manner as in Example 1. Thereafter, after methane gas ($CH_4$) and ammonia gas were introduced at a ratio of 1:2 and CVD was performed, preliminary particles were prepared by forming a carbon coating layer (thickness: 20 nm) containing nitrogen on the intermediate layer. As a result of measurement using an ONH analyzer, an amount of nitrogen included in the carbon coating layer was found to be 3.2 wt %.

Thereafter, mixed powder was prepared by mixing 10 g of the preliminary particles and 0.8 g of Mg powder in an argon (Ar) atmosphere. After the mixed powder was put in a tube furnace and the temperature was increased to 950° C. at a rate of 5° C./min in an Ar gas atmosphere, a heat treatment was performed for 2 hours. Thereafter, the temperature of the reaction furnace was reduced to room temperature, and the heat-treated mixed powder was taken out and washed by stirring in 1 M HCl for 1 hour. The washed mixed powder was washed with distilled water while filtering the washed mixed powder and then dried in an oven at 60° C. for 8 hours. Accordingly, primary particles comprising the core, in which a metal compound comprising MgO, $Mg_2SiO_4$, and $MgSiO_3$ was included, were prepared. As a result of quantitative XRD analysis, it was confirmed that the metal compound was included in the core in an amount of 30 wt % based on a total weight of the core.

A solution, in which the primary particles and ethanol/water (volume ratio=1:9) were included in a volume ratio of 1:10, was stirred at 10,000 rpm for 30 minutes with a mechanical homogenizer to prepare a dispersion solution for spray drying. The dispersion solution was spray-dried under conditions comprising an inlet temperature of 180° C., an aspirator rate of 95%, and a feeding rate of 12 using a mini spray-dryer (manufacturer: Buchi, model: B-290 Mini Spray-Dryer) to prepare preliminary secondary particles, and the preliminary secondary particles were then transferred to an alumina boat. After a temperature of a tube furnace equipped with a quartz tube with a length of 80 cm and an inner diameter of 4.8 cm was increased to 600° C. at a rate of 10° C./min, secondary particles were prepared by sintering while maintaining the temperature for 2 hours. An average particle diameter ($D_{50}$) of the secondary particles prepared was 5 μm.

(2) Preparation of Negative Electrode and Secondary Battery

A negative electrode and a secondary battery were prepared in the same manner as in Example 1 by using the negative electrode active material.

Example 3: Preparation of Battery (1) Preparation of Negative Electrode Active Material An intermediate layer was formed on the core in the same manner as in Example 1. Thereafter, after methane gas ($CH_4$) and ammonia gas were introduced at a ratio of 1:2 and CVD was performed, preliminary particles were prepared by forming a carbon coating layer (thickness: 20 nm) containing nitrogen on the intermediate layer. As a result of measurement using an ONH analyzer, an amount of nitrogen included in the carbon coating layer was found to be 3.2 wt %.

Thereafter, mixed powder was prepared by mixing 10 g of the preliminary particles and 0.8 g of Li powder in an argon (Ar) atmosphere. After the mixed powder was put in a tube furnace and the temperature was increased to 950° C. at a rate of 5° C./min in an Ar gas atmosphere, a heat treatment was performed for 2 hours. Thereafter, the temperature of the reaction furnace was reduced to room temperature, and the heat-treated mixed powder was taken out. Accordingly, primary particles comprising the core, in which a metal compound comprising $Li_2SiO_3$, $Li_4SiO_4$, and $Li_2Si_2O_5$ was included, were prepared. As a result of quantitative XRD analysis, it was confirmed that the metal compound was included in the core in an amount of 40 wt % based on a total weight of the core.

A solution, in which the primary particles and ethanol/water (volume ratio=1:9) were included in a volume ratio of 1:10, was stirred at 10,000 rpm for 30 minutes with a mechanical homogenizer to prepare a dispersion solution for spray drying. The dispersion solution was spray-dried under conditions comprising an inlet temperature of 180° C., an aspirator rate of 95%, and a feeding rate of 12 using a mini spray-dryer (manufacturer: Buchi, model: B-290 Mini Spray-Dryer) to prepare preliminary secondary particles, and the preliminary secondary particles were then transferred to an alumina boat. After a temperature of a tube furnace equipped with a quartz tube with a length of 80 cm and an inner diameter of 4.8 cm was increased to 600° C. at a rate of 10° C./min, secondary particles were prepared by sintering while maintaining the temperature for 2 hours. An average particle diameter ($D_{50}$) of the secondary particles prepared was 5 μm.

(2) Preparation of Negative Electrode and Secondary Battery

A negative electrode and a secondary battery were prepared in the same manner as in Example 1 by using the negative electrode active material.

Example 4: Preparation of Battery (1) Preparation of Negative Electrode Active Material The primary particles prepared in Example 1 and the primary particles prepared in Example 2 were mixed in a ratio of 1:1. A solution, in which the mixed primary particles and ethanol/water (volume ratio=1:9) were included in a volume ratio of 1:10, was stirred at 10,000 rpm for 30 minutes with a mechanical homogenizer to prepare a dispersion solution for spray drying. The dispersion solution was spray-dried under conditions comprising an inlet temperature of 180° C., an aspirator rate of 95%, and a feeding rate of 12 using a mini spray-dryer (manufacturer: Buchi, model: B-290 Mini Spray-Dryer) to prepare preliminary secondary particles, and the preliminary secondary particles were then transferred to an alumina boat. After a temperature of a tube furnace equipped with a quartz tube with a length of 80 cm and an inner diameter of 4.8 cm was increased to 600° C. at a rate of 10° C./min, secondary particles were prepared by sintering while maintaining the temperature for 2 hours. An average particle diameter ($D_{50}$) of the secondary particles prepared was 5 μm.

(2) Preparation of Negative Electrode and Secondary Battery

A negative electrode and a secondary battery were prepared in the same manner as in Example 1 by using the negative electrode active material.

Example 5: Preparation of Battery (1) Preparation of Negative Electrode Active Material The primary particles prepared in Example 1 and the primary particles prepared in Example 3 were mixed in a ratio of 1:1. A solution, in which the mixed primary particles and ethanol/water (volume ratio=1:9) were included in a volume ratio of 1:10, was stirred at 10,000 rpm for 30 minutes with a mechanical homogenizer to prepare a dispersion solution for spray drying. The dispersion solution was spray-dried under conditions comprising an inlet temperature of 180° C., an aspirator rate of 95%, and a feeding rate of 12 using a mini spray-dryer (manufacturer: Buchi, model: B-290 Mini Spray-Dryer) to prepare preliminary secondary particles, and the preliminary secondary particles were then transferred to an alumina boat. After a temperature of a tube furnace equipped with a quartz tube with a length of 80 cm and an inner diameter of 4.8 cm was increased to 600° C. at a rate of 10° C./min, secondary particles were prepared by sintering while maintaining the temperature for 2 hours. An average particle diameter ($D_{50}$) of the secondary particles prepared was 5 μm.

(2) Preparation of Negative Electrode and Secondary Battery

A negative electrode and a secondary battery were prepared in the same manner as in Example 1 by using the negative electrode active material.

Comparative Example 1: Preparation of Battery (1) Preparation of Negative Electrode Active Material A core having an intermediate layer formed thereon was prepared in the same manner as in Example 1, and CVD was then performed using methane gas as a source. Accordingly, preliminary particles comprising a carbon coating layer (thickness: 5 nm) without nitrogen were prepared.

A solution, in which the primary particles and ethanol/water (volume ratio=1:9) were included in a volume ratio of 1:10, was stirred at 10,000 rpm for 30 minutes with a mechanical homogenizer to prepare a dispersion solution for spray drying. The dispersion solution was spray-dried under conditions comprising an inlet temperature of 180° C., an aspirator rate of 95%, and a feeding rate of 12 using a mini spray-dryer (manufacturer: Buchi, model: B-290 Mini Spray-Dryer) to prepare preliminary secondary particles, and the preliminary secondary particles were then transferred to an alumina boat. After a temperature of a tube furnace equipped with a quartz tube with a length of 80 cm and an inner diameter of 4.8 cm was increased to 600° C. at a rate of 10° C./min, secondary particles were prepared by sintering while maintaining the temperature for 2 hours. An average particle diameter ($D_{50}$) of the secondary particles prepared was 5 μm.

(2) Preparation of Negative Electrode and Secondary Battery

A negative electrode and a secondary battery were prepared in the same manner as in Example 1 by using the negative electrode active material.

Comparative Example 2: Preparation of Battery (1) Preparation of Negative Electrode Active Material Methane gas ($CH_4$) and ammonia gas were introduced into 10 g of SiO having an average particle diameter ($D_{50}$) of 1 μm at a ratio of 1:2 and CVD was performed. Accordingly, preliminary particles were prepared by forming a carbon coating layer (thickness: 5 nm) containing nitrogen on the SiO. In the carbon coating layer formed, an amount of nitrogen was 3.1 wt %.

A solution, in which the primary particles and ethanol/water (volume ratio=1:9) were included in a volume ratio of 1:10, was stirred at 10,000 rpm for 30 minutes with a mechanical homogenizer to prepare a dispersion solution for spray drying. The dispersion solution was spray-dried under conditions comprising an inlet temperature of 180° C., an aspirator rate of 95%, and a feeding rate of 12 using a mini spray-dryer (manufacturer: Buchi, model: B-290 Mini Spray-Dryer) to prepare preliminary secondary particles, and the preliminary secondary particles were then transferred to an alumina boat. After a temperature of a tube furnace equipped with a quartz tube with a length of 80 cm and an inner diameter of 4.8 cm was increased to 600° C. at a rate of 10° C./min, secondary particles were prepared by sintering while maintaining the temperature for 2 hours. An average particle diameter ($D_{50}$) of the secondary particles prepared was 5 μm.

(2) Preparation of Negative Electrode and Secondary Battery

A negative electrode and a secondary battery were prepared in the same manner as in Example 1 by using the negative electrode active material.

Comparative Example 3: Preparation of Battery (1) Preparation of Negative Electrode Active Material 10 g of SiO having an average particle diameter ($D_{50}$) of 1 μm was prepared and exposed to ultraviolet light under ozone conditions where moisture at normal pressure was blocked by an ultraviolet-ozone cleaner. Accordingly, an oxide layer was formed by oxidizing a surface of the SiO. Thereafter, methane gas ($CH_4$) and ammonia gas were introduced at a ratio of 1:2 and CVD was performed to prepare preliminary particles by forming a carbon coating layer (thickness: 20 nm) containing nitrogen on the oxide layer (intermediate layer). In the carbon coating layer formed, an amount of nitrogen was 3.5 wt %.

A solution, in which the primary particles and ethanol/water (volume ratio=1:9) were included in a volume ratio of 1:10, was stirred at 10,000 rpm for 30 minutes with a mechanical homogenizer to prepare a dispersion solution for spray drying. The dispersion solution was spray-dried under conditions comprising an inlet temperature of 180° C., an aspirator rate of 95%, and a feeding rate of 12 using a mini spray-dryer (manufacturer: Buchi, model: B-290 Mini Spray-Dryer) to prepare preliminary secondary particles, and the preliminary secondary particles were then transferred to an alumina boat. After a temperature of a tube furnace equipped with a quartz tube with a length of 80 cm and an inner diameter of 4.8 cm was increased to 600° C. at a rate of 10° C./min, secondary particles were prepared by sintering while maintaining the temperature for 2 hours. An average particle diameter ($D_{50}$) of the secondary particles prepared was 5 μm.

(2) Preparation of Negative Electrode and Secondary Battery

A negative electrode and a secondary battery were prepared in the same manner as in Example 1 by using the negative electrode active material.

Experimental Example 1: Evaluation of Discharge Capacity, Initial Efficiency, Capacity Retention, and Electrode Thickness Change Rate The secondary batteries of Examples 1 to 5 and Comparative Examples 1 to 3 were charged and discharged to evaluate discharge capacity, initial efficiency, capacity retention, and electrode thickness change rate, and the results thereof are listed in Table 1 below.

In $1^{st}$ cycle and $2^{nd}$ cycle, the secondary batteries were charged and discharged at 0.1 C, and charging and discharging were performed at 0.5 C from a $3^{rd}$ cycle to a 49th cycle. A $50^{th}$ cycle was terminated in a charged state (state in which lithium was included in the negative electrode), the battery was disassembled to measure a thickness, and the electrode thickness change rate was then calculated.

Charge condition: CC (constant current)/CV (constant voltage) (5 mV/0.005 C current cut-off)

Discharge condition: CC (constant current) condition 1.5 V

The discharge capacity (mAh/g) and the initial efficiency (%) were derived from the results during the first charge and discharge cycle. Specifically, the initial efficiency (%) was derived by the following calculation.

Initial efficiency (%)=(discharge capacity after the $1^{st}$ discharge/1st charge capacity)×100

The capacity retention and the electrode thickness change rate were derived by the following calculation, respectively.

Capacity retention (%)=(discharge capacity in the 49th cycle/discharge capacity in the first cycle)×100

Electrode thickness change rate (%)=(amount of change in final electrode thickness/initial electrode thickness)×100

TABLE 1

| Battery | Discharge capacity (mAh/g) | Initial efficiency (%) | Capacity retention (%) | Electrode thickness change rate (%) |
|---|---|---|---|---|
| Example 1 | 1570 | 74.0 | 80 | 105 |
| Example 2 | 1410 | 81.5 | 63 | 117 |
| Example 3 | 1286 | 87.1 | 62 | 115 |
| Example 4 | 1480 | 77.6 | 71 | 110 |
| Example 5 | 1437 | 79.4 | 71 | 112 |
| Comparative Example 1 | 1495 | 73.1 | 55 | 124 |
| Comparative Example 2 | 1510 | 73.5 | 20 | 145 |
| Comparative Example 3 | 1250 | 70.2 | 59 | 120 |

Referring to Table 1, with respect to Examples 1 to 5 which included the primary particles comprising both of the intermediate layer (silicon nitride layer) and the carbon coating layer containing nitrogen, it may be understood that initial efficiencies and capacity retentions were better and changes in electrode thickness were smaller than those of Comparative Examples 1 to 3.

With respect to Comparative Example 1, since the carbon coating layer did not include nitrogen, electrical conductivity of the primary particle was reduced and irreversible capacity was increased in comparison to Example 1, and thus, it may be confirmed that the discharge capacity was small and the initial efficiency and the capacity retention were low. Also, since degradation as the number of cycles increased was accelerated due to the low electrical conductivity, swelling was increased, and thus, the electrode thickness change rate was relatively large.

With respect to Comparative Example 2, since the intermediate layer (silicon nitride layer) was not included in the primary particle, it may be confirmed that the electrode thickness change rate was significantly larger than that of Example 1 and the capacity retention was also not good.

With respect to Comparative Example 3, since the primary particles, into which the oxide layer, instead of the silicon nitride layer, was introduced, were included, the surface of the core was oxidized, and thus, irreversible capacity was increased. Thus, it may be confirmed that the discharge capacity was low and the initial efficiency was low due to a reduction in the electrical conductivity of the primary particle.

Experimental Example 2: Thermal Stability Evaluation

The batteries of Examples 1 to 5 and Comparative Examples 1 to 3 were fully charged once, and high pressure differential scanning calorimetry (HP-DSC) was performed. Accordingly, thermal stability was evaluated, and the results thereof are presented in Table 2 below.

Charge condition: CC (constant current)/CV (constant voltage) (5 mV/0.005 C current cut-off)

In the first cycle, the coin cells were fully charged at 0.1 C, each coin cell was disassembled in a dry room, and only the negative electrode was then collected. The collected negative electrode was placed in an HP-DSC pan, 20 of the electrolyte solution was added, and thermal stability was then measured by HP-DSC (EQC-0277, Setaram Instrumentation) while increasing the temperature from 35° C. to 600° C. at a rate of 10° C./min.

TABLE 2

| Battery | Onset temperature (° C.) | Main peak (° C.) | Calorific value relative to negative electrode active material (kJ/g) |
|---|---|---|---|
| Example 1 | 250 | 285 | 10.5 |
| Example 2 | 242 | 286 | 12.1 |
| Example 3 | 240 | 285 | 12.3 |
| Example 4 | 243 | 284 | 11.6 |
| Example 5 | 243 | 285 | 11.7 |
| Comparative Example 1 | 217 | 284 | 13.5 |
| Comparative Example 2 | 214 | 286 | 14.7 |
| Comparative Example 3 | 230 | 285 | 13.2 |

Referring to Table 2, it may be understood that onset temperatures of the examples were higher than those of the comparative examples. This indicated that, with respect to the batteries using the negative electrode active material of the present invention, when an exothermic reaction occurred due to an internal short circuit of the battery or impact, an increase in temperature due to the heat may be delayed to prevent a series of exothermic reactions. With respect to the calorific value relative to the negative electrode active material, it may be confirmed that the examples had lower values than the comparative examples.

Experimental Example 3: Discharge Rate Characteristics Evaluation

Discharge rate characteristics of the batteries of Examples 1 to 5 and Comparative Examples 1 to 3 were evaluated and listed in Table 3 below.

A charge rate was fixed at 0.2 C, and a decrease in discharge capacity (%) was checked while changing a discharge rate to 0.2 C, 1.0 C, 3.0 C, and 5.0 C. In this case, the discharge capacity at a discharge rate of 0.2 C was set to 100%.

TABLE 3

| | Discharge rate | | | |
|---|---|---|---|---|
| | 0.2 C (%) | 1.0 C (%) | 3.0 C (%) | 5.0 C (%) |
| Example 1 | 100 | 97.43 | 90.77 | 81.37 |
| Example 2 | 100 | 97.50 | 90.81 | 81.48 |
| Example 3 | 100 | 97.47 | 91.14 | 81.83 |
| Example 4 | 100 | 99.01 | 92.25 | 83.58 |
| Example 5 | 100 | 99.02 | 92.27 | 83.65 |
| Comparative Example 1 | 100 | 96.84 | 84.59 | 75.30 |
| Comparative Example 2 | 100 | 97.10 | 84.62 | 75.32 |
| Comparative Example 3 | 100 | 95.21 | 81.83 | 72.26 |

Referring to Table 3, it may be confirmed that the discharge capacities of the batteries were reduced as the discharge rate was gradually increased to 0.2 C, 1.0 C, 3.0 C, and 5.0 C, wherein, since the batteries of Examples 1 to 5 had a smaller degree of decrease in discharge rate than the batteries of Comparative Examples 1 to 3, it may be confirmed that discharge rate characteristics were better.

In the examples, it may be confirmed that the batteries of Examples 4 and 5 exhibited better discharge rate characteristics than the batteries of Examples 1 to 3. Thus, it may be confirmed that the secondary particle of the negative electrode active material, which included both of the primary particle not doped with metal and the primary particle having a metal compound doped into at least one of the core, the intermediate layer, and the carbon coating layer, was more effective in improving the discharge rate characteristics of the battery in comparison to the secondary particle of the negative electrode active material which included any one of the primary particle not doped with metal and the primary particle having a metal compound doped into at least one of the core, the intermediate layer, and the carbon coating layer.

The invention claimed is:

1. A negative electrode active material, comprising:
   a secondary particle, comprising first primary particles, wherein the first primary particles comprise
      a core comprising $SiO_x$, wherein $0 \leq x < 2$;
      an intermediate layer which covers at least a portion of a surface of the core and comprises silicon nitride, silicon oxynitride, or a mixture thereof; and
      a carbon coating layer which covers at least a portion of the intermediate layer and comprises nitrogen-doped carbon,
   wherein, in the carbon coating layer, the nitrogen is included in an amount of 0.05 wt % to 3.2 wt % based on a total weight of the carbon coating layer.

2. The negative electrode active material of claim 1, wherein at least one of the core, the intermediate layer, and the carbon coating layer of the primary particle comprises a metal compound.

3. The negative electrode active material of claim 2, wherein the metal compound comprises at least one of metal oxide and metal silicate.

4. The negative electrode active material of claim 3, wherein the metal compound comprises the metal oxide, wherein said metal oxide comprises an oxide of at least one selected from the group consisting of lithium (Li), magnesium (Mg), aluminum (Al), calcium (Ca), and titanium (Ti).

5. The negative electrode active material of claim 3, wherein the metal compound comprises the metal silicate, wherein said metal silicate comprises a silicate of at least one selected from the group consisting of Li, Mg, Al, Ca, and Ti.

6. The negative electrode active material of claim 2, wherein the metal compound is included in the first primary particles in an amount of 1 wt % to 60 wt % based on a total weight of the core.

7. The negative electrode active material of claim 1, wherein, in addition to the first primary particles, the secondary particle further comprises
metal compound-doped primary particles which comprise a core comprising $SiO_x$, wherein $0 \leq x < 2$;
an intermediate layer which covers at least a portion of a surface of the core and comprises silicon nitride, silicon oxynitride, or a mixture thereof; and
a carbon coating layer which covers at least a portion of the intermediate layer and comprises nitrogen-doped carbon,
wherein at least one of the core, the intermediate layer, and the carbon coating layer of the metal compound-doped primary particles comprises a metal compound,
wherein, in the carbon coating layer, the nitrogen is included in an amount of 0.05 wt % to 3.2 wt % based on a total weight of the carbon coating layer.

8. The negative electrode active material of claim 7, wherein the secondary particle comprises the first primary particles and the metal compound-doped primary particles in a weight ratio of 10:90 to 90:10.

9. The negative electrode active material of claim 1, wherein the core has an average particle diameter ($D_{50}$) of 0.1 μm to 100 μm.

10. The negative electrode active material of claim 1, wherein the intermediate layer has a thickness of 1 nm to 100 nm.

11. The negative electrode active material of claim 1, wherein the carbon coating layer has a thickness of 1 nm to 100 nm.

12. The negative electrode active material of claim 1, wherein a weight ratio of the intermediate layer to the carbon coating layer is in a range of 1:99 to 20:80.

13. A negative electrode comprising the negative electrode active material of claim 1.

14. A secondary battery comprising:
the negative electrode of claim 13;
a positive electrode;
a separator disposed between the positive electrode and the negative electrode; and
an electrolyte.

* * * * *